US010888814B2

(12) United States Patent
Atkins et al.

(10) Patent No.: US 10,888,814 B2
(45) Date of Patent: Jan. 12, 2021

(54) REMOVAL OF CARBON DIOXIDE FROM A GAS STREAM BY USING AQUEOUS IONIC LIQUID

(75) Inventors: Martin Atkins, Belfast (GB); Yong Cheun Kuah, Belfast (GB); Julien Estager, Belfast (GB); Shieling Ng, Belfast (GB); Alex Oliferenko, Belfast (GB); Natalia Plechkova, Belfast (GB); Alberto Puga, Belfast (GB); Kenneth Seddon, Belfast (GB); David Wassell, Belfast (GB)

(73) Assignee: The Queen's University of Belfast, Belfast (GB)

(*) Notice: Subject to any disclaimer, the term of this patent is extended or adjusted under 35 U.S.C. 154(b) by 0 days.

(21) Appl. No.: 13/634,582

(22) PCT Filed: Mar. 18, 2011

(86) PCT No.: PCT/GB2011/050546
§ 371 (c)(1),
(2), (4) Date: Nov. 5, 2012

(87) PCT Pub. No.: WO2011/114168
PCT Pub. Date: Sep. 22, 2011

(65) Prior Publication Data
US 2013/0058852 A1   Mar. 7, 2013

(30) Foreign Application Priority Data
Mar. 19, 2010   (GB) .................................. 1004638.1

(51) Int. Cl.
*B01D 53/14*   (2006.01)

(52) U.S. Cl.
CPC ..... *B01D 53/1493* (2013.01); *B01D 53/1475* (2013.01); *B01D 2251/80* (2013.01); *B01D 2256/24* (2013.01); *B01D 2257/80* (2013.01); *B01D 2258/05* (2013.01); *Y02A 50/20* (2018.01); *Y02C 20/40* (2020.08)

(58) Field of Classification Search
None
See application file for complete search history.

(56) References Cited

U.S. PATENT DOCUMENTS 7,585,415 B2 * 9/2009 Wyse et al. .................... 210/639
2002/0189444 A1 12/2002 Brennecke
(Continued)

FOREIGN PATENT DOCUMENTS

DE   102004053167   5/2006
JP   2009106909   5/2009
(Continued)

OTHER PUBLICATIONS

Scurto et al., "Melting Point Depression of Ionic Liquids with CO2: Phase Equilibria", Ind. Eng. Chem. Res. 2008, 47, 493-501.*
(Continued)

*Primary Examiner* — Anita Nassiri-Motlagh
(74) *Attorney, Agent, or Firm* — Ryan T. Grace; Advent, LLP

(57) ABSTRACT

The present invention relates to the separation of gases, and more specifically to an inventive process for the removal of carbon dioxide gas using carefully selected ionic liquid absorbents together with water in a carefully selected ratio.

31 Claims, 7 Drawing Sheets

(56) References Cited

U.S. PATENT DOCUMENTS

| | | | |
|---|---|---|---|
| 2004/0035293 A1* | 2/2004 | Davis, Jr. .................. | 95/140 |
| 2005/0129598 A1 | 6/2005 | Chinn | |
| 2005/0274258 A1* | 12/2005 | Spencer .................. | 95/236 |
| 2006/0251558 A1* | 11/2006 | Chinn et al. .............. | 423/230 |
| 2009/0291874 A1* | 11/2009 | Bara .................. | C11D 7/3209 |
| | | | 510/175 |

FOREIGN PATENT DOCUMENTS

| | | |
|---|---|---|
| WO | 0174472 | 10/2001 |
| WO | 2007021463 | 2/2007 |
| WO | 2007030888 | 3/2007 |
| WO | 2007101397 | 9/2007 |

OTHER PUBLICATIONS

Blanchard et al., "High-Pressure Phase Behavior of Ionic Liquid/CO2 systems", J. Phys. Chem. B 2001, 105, 2437-2444.*

Jessica L. Anderson, "Solubility of CO2, CH4, C2H6, C2H4, O2, and N2 in 1 Hexyl-3-methylpyridinium Bis(trifluoromethylsulfonyl)imide: Comparison to Other Ionic Liquids", Accounts of Chemical Research, 2007, p. 1208-1216, vol. 40, No. 11, American Chemical Society.

Varinder K. Aggarwal, "Unexpected side reactions of imidazolium-based ionic liquids in the base-catalysed Baylis-Hillman reaction", Chem. Comm., 2002, p. 1612-1613, the Royal Society of Chemistry.

Eleanor D. Bates, "CO2 Capture by a Task-Specific Ionic Liquid", J. Am. Chem. Soc., 2002, p. 926-927, vol. 124, No. 6, American Chemical Society.

Pedro J. Carvalho, "Specific Solvation Interactions of CO2 on Acetate and Triflouroacetate Imidazolium Based Ionic Liquids at High Pressures", J. Phys. Chem. B, 2009, p. 6803-6812, vol. 113, No. 19, American Chemical Society.

A. Yokozeki, "Physical and Chemical Absorptions of Carbon Dioxide in Room-Temperature Ionic Liquids", J. Phys. Chem. B, 2008, p. 16654-16663, vol. 112, No. 51, American Chemical Society.

Jianmin Zhang, "Supported Absorption of CO2 by Tetrabutylphosphonium Amino Acid Ionic Liquids", Chem. Eur. J., 2006, p. 4021-4026,12, Wiley-VCH Verlag GmbH & Co. KGaA, Weinham.

Supported Absorption of Co2 by Tetrabutylphosphonium Amino Acid Ionic Liquids—Jianmin Zhang et al. (Chemistry European Journal, 2006. vol. 12, pp. 4021-4026).

* cited by examiner

REMOVAL OF CARBON DIOXIDE FROM A GAS STREAM BY USING AQUEOUS IONIC LIQUID

The present invention relates to the separation of gases, and more specifically to an inventive process for the removal of carbon dioxide gas using carefully selected liquid absorbents.

The separation of carbon dioxide from gas streams is an extremely active field of research, due to the increasing concern about global warming from the greenhouse effect, and the common belief that the build up of carbon dioxide in the atmosphere is a contributing factor.

In the field of natural gas processing, separation of carbon dioxide and other acidic (sour) gases from the natural gas stream is also of importance to improve the fuel quality and to avoid corrosion problems in metal pipelines.

Separation of carbon dioxide is also important in the field of biogas. Biogas is the result of microbial degradation of organic waste. Biogas streams contain large amounts of carbon dioxide (and other acid gases) and water vapour in addition to the methane and light hydrocarbons of interest. Hence, removal of carbon dioxide to improve the quality of biogas is necessary as for natural gas.

Carbon dioxide removal processes are of importance in the field of life support systems. For human occupied sealed systems containing a breathing gas mixture, such as submarines and SCBA gear as well as underground mining shelters and spacecraft, the build-up of metabolites such as carbon dioxide and water vapour must be removed to maintain life. Current technologies rely on carbon dioxide scrubbers (typically a solid material such as lithium hydroxide or zeolites) as well as a separate dehumidifier (see for example BioPak 240). As is the case for natural gas and biogas treatment, the process may be simplified by combing the two procedures in one step.

For both of these reasons, the implementation of carbon dioxide separation processes in industry has gained importance over the last few decades.

The technologies used for the purpose of carbon dioxide separation can be divided into three groups: liquid absorbents, solid absorbents or adsorbents, and membranes. Liquid absorbents are by far the most commonly used of these, and can in turn be divided into physical and chemical absorbents.

In the field of natural gas processing, chemical absorbents are often preferred, since they generally have higher absorption capacities for carbon dioxide. The energy efficiency of chemical absorption processes is determined largely by the energy demands of regenerating the absorbent by desorption of the carbon dioxide.

The most commonly used chemical absorbents for carbon dioxide removal include aqueous amine solutions, chilled ammonia and hot aqueous potassium carbonate. However, these require high temperatures to be recycled, in general far above 100° C. In addition, the high basicity and solvent strength of these systems often leads to other problems such as corrosion of pipelines and other steel parts in the plant. Another drawback of these liquid chemical absorption systems, in particular the aqueous amine systems, is that the amines are volatile and toxic and thus can contaminate the gas stream with loss of absorbent, and also represent a hazard in the workplace. With hot aqueous potassium carbonate absorbents, the major drawbacks include high operating temperatures and the tendency of the salts to crystallize/precipitate during processing. Dilution of the solutions so as to minimize corrosion or crystallization/precipitation issues entails a consequent reduction in carbon dioxide absorption capacity.

Ionic liquids are a class of compounds which have been the subject of intense research over the past few decades. The term "ionic liquid" as used herein refers to a liquid that is capable of being produced by melting a solid, and when so produced consists solely of ions. The term "ionic liquid" includes both compounds having high melting temperature and compounds having low melting points, e.g. at or below room temperature (i.e. 15 to 30° C.). The latter are often referred to as "room temperature ionic liquids" and are often derived from organic salts having pyridinium- and imidazolium-based cations. A feature of ionic liquids is that they have particularly low (essentially zero) vapour pressures. Many organic ionic liquids have low melting points, for example, less than 100° C., particularly less than 80° C., and around room temperature, e.g. 15 to 30° C., and some have melting points well below 0° C.

An ionic liquid may be formed from a homogeneous substance comprising one species of cation and one species of anion, or it can be composed of more than one species of cation and/or anion. Thus, an ionic liquid may be composed of more than one species of cation and one species of anion. An ionic liquid may further be composed of one species of cation, and more than one species of anion.

Ionic liquids generally exhibit a set of appealing physicochemical characteristics that typically include extremely low vapour pressure, wide liquid range, non-degradability, non-flammability, good thermal stability and excellent ability to solubilise a large range of compounds. Due to the potential for controlling the properties of ionic liquids by judicious choice of the constituent ions, and the multiple combinations of ions that can result in low-melting salts, ionic liquids have been proposed for a broad range of applications.

Ionic liquids have been proposed as an alternative to chemical and physical acid gas absorbents for a number of reasons including: (i) the possibility of controlling their properties by the selection of the cation and anion components; (ii) the limited tendency of ionic liquids to crystallize under operating conditions; and (iii) the potential to prevent contamination of the gaseous streams by the absorbent due to the negligible vapour pressure of ionic liquids.

Anderson et al. (Accounts of Chemical Research, 2007, volume 40, pages 1208 to 1216) have reviewed the absorption of a number of different gases in pyridinium, imidazolium and ammonium ionic liquids. The molar enthalpies ($\Delta H$) of gas dissolution were determined for the group of gases tested, and the low values observed indicate that only physical absorption takes place. In particular, carbon dioxide is said to interact with the ionic liquids by means of dispersion, dipole/induced dipole interactions and electrostatic effects.

The use of ionic liquids as chemical $CO_2$ absorbers has also been reported. Bates et al. (Journal of the American Chemical Society, 2002, volume 124, pages 926 to 927) have reported the use of a basic imidazolium ionic liquid having an amine functionality tethered to the imidazolium cation to sequester carbon dioxide as a carbamate. However, the high viscosity of these ionic liquids both before, and especially after, carbon dioxide sequestration appears to be a serious limitation for their potential use in industrial processes.

Carvalho et al. (Journal of Physical Chemistry B, 2009, volume 113, pages 6803 to 6812) have reported the use of 1-butyl-3-methylimidazolium ionic liquids having acetate and trifluoroacetate anions as absorbents for carbon dioxide. This document teaches that purifying the ionic liquid by removal of water prior to use is essential to avoid a reduction in carbon dioxide absorbing capacity which is reported to take place when water is present in the ionic liquid. A number of prior art documents are cited by Carvalho et al., each of which support the deleterious effect of using wet ionic liquids for carbon dioxide absorption.

The absorption of carbon dioxide by ionic liquids containing imidazolium cations is also disclosed by Shiflett et al. (Journal of Physical Chemistry B, 2008, volume 112, pages 16654 to 16663). Again, the ionic liquids are purified by removing water under vacuum with heating for a period of 5 days, emphasizing the need for the ionic liquids to be dry. A single phosphonium ionic liquid (tetra-n-butylphosphonium formate) was also analysed, again in the absence of water, and shown to absorb modest amounts of carbon dioxide by a physical absorption mechanism.

The present inventors have found, however, that the use of imidazolium ionic liquids in industrial processes is seriously limited by the instability of these ionic liquids to many of the components found in natural gas streams. Reaction of the imidazolium ions with components of the gaseous stream can lead to loss of absorbent, and contamination of the remaining absorbent with degradation products of the ionic liquid. The instability of imidazolium ionic liquids has been discussed in detail by Aggarwal, V. K. et. al. (Chemical Communications 2002, 1612-1613) and Earle, M. J. at the ACS symposium Washington D.C. 2001 (Abstracts of Papers of the American Chemical Society, 2001, volume 221, 161). There is therefore a need in the art for alternative ionic liquid absorbents that are both capable of absorbing useful quantities of carbon dioxide from gaseous streams, while also being resistant to degradation during processing.

The present invention is based on the surprising discovery that, contrary to the teaching in the art to rigorously dry ionic liquids that are used to absorb carbon dioxide, selected classes of ionic liquids demonstrate a marked improvement in carbon dioxide absorption capacity in the presence of water. More specifically, it has been found that mixtures of water and ionic liquids comprising tetrasubstituted phosphonium or tetrasubstituted ammonium cations with anions that are conjugate bases of carboxylic acids, in fact demonstrate a marked improvement in carbon dioxide absorption capacity when compared to the ionic liquid alone in the absence of water.

In addition, it has been found that the selected ionic liquids are extremely stable to the processing conditions used for separation of carbon dioxide from gaseous streams, and are highly resistant to degradation by other contaminants that may be present in the gaseous streams.

It has also been found that mixtures of the selected classes of ionic liquids and water are also highly effective in removing other substances, such as water vapour, from gaseous streams. The mixtures of ionic liquids and water may therefore be used in processes for the combined removal of carbon dioxide and one or more additional substances, such as water, from gaseous streams.

Furthermore, it has been found that carbon dioxide and other substances can be easily desorbed from the mixtures of ionic liquids and water. For instance, carbon dioxide can be desorbed by heating in the presence of a sparging gas (e.g. nitrogen gas), or by pressure reduction, allowing the mixtures to be recycled to the separation process without loss or degradation of the absorbent mixture.

According to the present invention, there is provided a process for removing carbon dioxide from a gaseous stream comprising contacting the gaseous stream with a carbon dioxide absorbent comprising a mixture of an ionic liquid and water in a molar ratio of from 20:80 to 80:20, wherein the ionic liquid has the formula:

[Cat⁺][X⁻]

wherein: [Cat⁺] represents a cationic species selected from tetrasubstituted phosphonium cations, tetrasubstituted ammonium cations, trisubstituted sulfonium cations, guanidinium cations and quinolinium cations; and [X⁻] represents an anionic species which is a conjugate base of a carboxylic acid.

Preferably, [Cat⁺] is selected from tetrasubstituted phosphonium cations, tetrasubstituted ammonium cations, and trisubstituted sulfonium cations having the formulae:

[P(R$^a$)(R$^b$)(R$^c$)(R$^d$)]⁺,[N(R$^a$)(R$^b$)(R$^c$)(R$^d$)]⁺ and [S(R$^b$)(R$^c$)(R$^d$)]⁺ wherein R$^a$, R$^b$, R$^c$, and R$^d$ are each independently selected from a $C_1$ to $C_{20}$ straight chain or branched alkyl group, a $C_3$ to $C_8$ cycloalkyl group, or a $C_6$ to $C_{10}$ aryl group, or wherein any two of R$^a$, R$^b$, R$^c$, and R$^d$ may together form a saturated methylene chain of the formula —(CH$_2$)$_q$—, where q is an integer of from 4 to 7, or an oxyalkylene chain of the formula —(CH$_2$)$_2$—O—(CH$_2$)$_2$—, wherein said alkyl, cycloalkyl or aryl groups, said methylene chain, or said oxyalkylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO$_2$, —CO$_2$($C_1$ to $C_6$)alkyl, —OC(O)($C_1$ to $C_6$)alkyl, $C_7$ to $C_{30}$ aralkyl $C_7$ to $C_{30}$ alkaryl, and —N(R$^z$)$_2$, where each R$^z$ is independently selected from hydrogen, methyl, ethyl, n-propyl and iso-propyl, and wherein R$^b$ may also be hydrogen.

More preferably, [Cat⁺] is selected from tetrasubstituted phosphonium cations and tetrasubstituted ammonium cations having the formulae:

[P(R$^a$)(R$^b$)(R$^c$)(R$^d$)]⁺ and [N(R$^a$)(R$^b$)(R$^c$)(R$^d$)]⁺ wherein: R$^a$, R$^b$, R$^c$, and R$^d$ as defined above.

Still more preferably, [Cat⁺] is selected from tetrasubstituted phosphonium cations having the formula:

[P(R$^a$)(R$^b$)(R$^c$)(R$^d$)]⁺ wherein: R$^a$, R$^b$, R$^c$, and R$^d$ as defined above.

In the tetrasubstituted phosphonium cations, tetrasubstituted ammonium cations, trisubstituted sulfonium cations defined above, R$^a$, R$^b$, R$^c$, and R$^d$ (where present) are preferably each independently selected from a $C_1$ to $C_{16}$ straight chain or branched alkyl group, or any two of R$^a$, R$^b$, R$^c$, and R$^d$ may together form a methylene chain of the formula —(CH$_2$)$_q$—, where q is an integer of from 4 or 5.

More preferably, R$^a$, R$^b$, R$^c$, and R$^d$ (where present) are preferably each independently selected from a $C_1$ to $C_{16}$ straight chain or branched alkyl group. Examples of preferred alkyl groups include: n-butyl, n-pentyl, n-hexyl, n-heptyl, n-octyl, n-nonyl, n-decyl, n-undecyl, n-dodecyl, n-tridecyl, and n-tetradecyl.

Still more preferably, R$^a$, R$^b$ and R$^c$, (where present) are preferably each independently selected from a $C_1$ to $C_8$ straight chain or branched alkyl group, and R$^d$ is preferably a $C_4$ to $C_{16}$ straight chain or branched alkyl group. Most preferably, R$^a$, R$^b$ and R$^c$, (where present) are each the same $C_1$ to $C_8$ straight chain or branched alkyl group, and R$^d$ is preferably a $C_4$ to $C_{16}$ straight chain or branched alkyl group.

In a further preferred embodiment, two of R$^a$, R$^b$, R$^c$, and R$^d$ (where present) taken together form a saturated methylene chain of the formula —$(CH_2)_q$—, where q is an integer of from 4 to 7, or an oxyalkylene chain of the formula —$(CH_2)_2$—O—$(CH_2)_2$—. Preferably, q is an integer of 4 or 5.

Examples of preferred tetrasubstituted phosphonium cations and tetrasubstituted ammonium cations and trisubstituted sulfonium cations in accordance with the present invention, include those where $R^a$, $R^b$ and $R^c$ (where present) are each the same alkyl group selected from ethyl, n-butyl and n-hexyl, and where $R^d$ is selected from n-butyl, n-hexyl, n-octyl, n-decyl, n-dodecyl, and n-tetradecyl.

Specific examples of phosphonium cations that may be used in accordance with the present invention include n-butyl-triethylphosphonium, n-hexyl-triethylphosphonium, n-octyl-triethylphosphonium, tetra-n-butylphosphonium, n-hexyl-tri-n-butylphosphonium, n-octyl-tri-n-butylphosphonium, n-decyl-tri-n-butylphosphonium, n-dodecyl-tri-n-butylphosphonium, n-octyl-tri-n-hexylphosphonium, n-decyl-tri-n-hexylphosphonium, n-dodecyl-tri-n-hexylphosphonium, and n-tetradecyl-tri-n-hexylphosphonium.

Specific examples of ammonium cations that may be used in accordance with the present invention include n-butyl-triethylammonium, n-hexyl-triethylammonium, n-octyl-triethylammonium, tetra-n-butylammonium, n-hexyl-tri-n-butylammonium, n-octyl-tri-n-butylammonium, n-decyl-tri-n-butylammonium, n-dodecyl-tri-n-butylammonium, n-octyl-tri-n-hexylammonium, n-decyl-tri-n-hexylammonium, n-dodecyl-tri-n-hexylammonium, n-tetradecyl-tri-n-hexylammonium, choline.

Further examples of ammonium cations include pyrrolidinium, morpholinium, piperidinium which may optionally be substituted as described above.

Where, [Cat$^+$] is a quinolinium cation, it preferably has the formula:

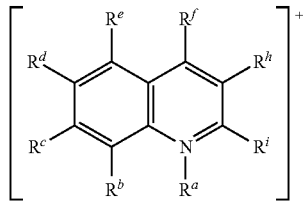

wherein: $R^a$, $R^b$, $R^c$, $R^d$, $R^e$, $R^f$, $R^g$, $R^h$ and $R^i$ are each independently selected from hydrogen, a $C_1$ to $C_{20}$ straight chain or branched alkyl group, a $C_3$ to $C_8$ cycloalkyl group, or a $C_6$ to $C_{10}$ aryl group, or any two of $R^b$, $R^c$, $R^d$, $R^e$, $R^f$, $R^h$ and $R^i$ attached to adjacent carbon atoms may form a saturated methylene chain —$(CH_2)_q$— wherein q is from 3 to 6, and wherein said alkyl, cycloalkyl or aryl groups, or said methylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO$_2$, —CO$_2$($C_1$ to $C_6$)alkyl, —OC(O)($C_1$ to $C_6$)alkyl, $C_7$ to $C_{30}$ aralkyl $C_7$ to $C_{30}$ alkaryl, and —N($R^z$)$_2$, where each $R^z$ is independently selected from hydrogen, methyl, ethyl, n-propyl and iso-propyl.

In the above quinolinium cations, $R^a$ is preferably selected from $C_1$ to $C_{20}$ linear or branched alkyl, more preferably $C_2$ to $C_{20}$ linear or branched alkyl, still more preferably $C_2$ to $C_{16}$ linear or branched alkyl, and most preferably $C_4$ to $C_{10}$ linear or branched alkyl. Examples of suitable $R^a$ groups include ethyl, butyl, hexyl, octyl, nonyl, decyl, undecyl, dodecyl, tridecyl, tetradecyl, pentadecyl, hexadecyl, heptadecyl and octadecyl.

In the above quinolinium cations, $R^b$, $R^c$, $R^d$, $R^e$, $R^f$, $R^h$ and $R^i$ are preferably independently selected from hydrogen and $C_1$ to $C_5$ linear or branched alkyl, and more preferably $R^b$, $R^c$, $R^d$, $R^e$, and $R^f$ are hydrogen.

Examples of preferred quinolinium and cations which may be used in accordance with the present invention include: N—($C_8$-$C_{18}$)alkyl-quinolinium, and N—($C_8$-$C_{18}$) alkyl-6-methylquinolinium.

Where, [Cat$^+$] is a guanidinium cation, it preferably has the formula:

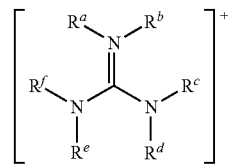

wherein: $R^a$, $R^b$, $R^c$, $R^d$, $R^e$, and $R^f$ are each independently selected from a $C_1$ to $C_{20}$ straight chain or branched alkyl group, a $C_3$ to $C_8$ cycloalkyl group, or a $C_6$ to $C_{10}$ aryl group, or any two of $R^h$, $R^c$, $R^d$, $R^e$, $R^f$, $R^h$ and $R^i$ attached to adjacent carbon atoms may form a saturated methylene chain —$(CH_2)_q$— wherein q is from 3 to 6, and wherein said alkyl, cycloalkyl or aryl groups, or said methylene chain are unsubstituted or may be substituted by one to three groups selected from: $C_1$ to $C_6$ alkoxy, $C_2$ to $C_{12}$ alkoxyalkoxy, $C_6$ to $C_{10}$ aryl, —CN, —OH, —NO$_2$, —CO$_2$($C_1$ to $C_6$)alkyl, —OC(O)($C_1$ to $C_6$)alkyl, $C_7$ to $C_{30}$ aralkyl $C_7$ to $C_{30}$ alkaryl, and —N($R^z$)$_2$, where each $R^z$ is independently selected from hydrogen, methyl, ethyl, n-propyl and iso-propyl.

In the above guanidium cations, $R^a$ is preferably selected from $C_1$ to $C_{20}$ linear or branched alkyl, more preferably $C_2$ to $C_{20}$ linear or branched alkyl, still more preferably $C_2$ to $C_{16}$ linear or branched alkyl, and most preferably $C_4$ to $C_{10}$ linear or branched alkyl. Examples of suitable $R^a$ groups include ethyl, butyl, hexyl, octyl, nonyl, decyl, undecyl, dodecyl, tridecyl, tetradecyl, pentadecyl, hexadecyl, heptadecyl and octadecyl.

In the above guanidinium cations, $R^b$, $R^c$, $R^d$, $R^e$ and $R^f$ are preferably selected from $C_1$ to $C_{10}$ linear or branched alkyl, more preferably, $C_1$ to $C_5$ linear or branched alkyl, and most preferably $R^b$, $R^c$, $R^d$, $R^e$ and $R^f$ are each a methyl group.

In accordance with the present invention, [X$^-$] is preferably selected from anions having the formula [R$^x$CO$_2$]$^-$, wherein R$^x$ is selected from hydrogen, a $C_1$ to $C_{10}$ straight chain or branched alkyl group, a $C_3$ to $C_8$ cycloalkyl group, or a $C_6$ to $C_{10}$ aryl group, wherein said alkyl, cycloalkyl or aryl groups are unsubstituted or may be substituted by one or more groups selected from —F, —Cl, —OH, —CN, —NO$_2$, —SH, =O and —CO$_2$H.

It will be appreciated that where R$^x$ is substituted by a group having the formula —CO$_2$$^-$, [X$^-$] will be a dianionic species. It will therefore be appreciated that the present invention is not limited to ionic liquids comprising anions and cations having only a single charge. Thus, the formula [Cat$^+$][X$^-$] is intended to encompass ionic liquids comprising, for example, doubly, triply and quadruply charged anions and/or cations. The relative stoichiometric amounts of [Cat$^+$] and [X$^-$] in the ionic liquid are therefore not fixed, but can be varied to take account of cations and anions with multiple charges. For example, the formula [Cat⁺][X⁻] should be understood to include ionic liquid species having the formulae $[Cat^+]_2[X^{2-}]$; $[Cat^{2+}][X^-]_2$; $[Cat^{2+}][X^{2-}]$; $[Cat^+]_3[X^{3-}]$; $[Cat^{3+}][X^-]_3$ and so on.

More preferably, $R^x$ is selected from hydrogen, or a $C_1$ to $C_{10}$ straight chain or branched alkyl group, wherein said alkyl group is optionally substituted by one or more groups selected from —F and —OH.

Examples of anions which may be used in accordance with the present invention include: formate, acetate, trifluoroacetate, hydroxyacetate, propanoate, pentafluoro-propanoate, lactate, butanoate, isobutanoate, pivalate, pyruvate, thiolactate, oxalate, tartrate, malonate, succinate, adipate and benzoate.

More preferably, the anion is selected from: formate, acetate, trifluoroacetate, hydroxyacetate, propanoate, pentafluoropropanoate, lactate, butanoate, isobutanoate and pivalate.

In one preferred embodiment, [X⁻] is acetate.

In another preferred embodiment, [X⁻] is formate.

The ionic liquids used in accordance with the present invention preferably have a melting point of 100° C. or less, more preferably 50° C. or less, and most preferably 25° C. or less. Ionic liquids having lower melting points are less likely to crystallise in the process of the invention, making them easier to handle.

The molar ratio of ionic liquid to water is preferably in the range of from 70:30 to 30:70, still more preferably in the range of from 60:40 to 40:60, still more preferably in the range of from 55:45 to 45:55, and most preferably the molar ratio of ionic liquid to water is 50:50.

The gaseous stream is preferably contacted with the carbon dioxide absorbent at a temperature of from 10 to 80° C., more preferably from 10 to 50° C. and most preferably from 20 to 30° C. For example, the gaseous stream may be contacted with the carbon dioxide absorbent at a temperature at or around 25° C.

The gaseous stream is preferably contacted with the carbon dioxide absorbent at a pressure of from 100 to 2000 kPa, and more preferably from 200 to 1000 kPa. For example. the gaseous stream may be contacted with the carbon dioxide absorbent at a pressure at or around 500 kPa.

The process of the present invention may be used to remove carbon dioxide, and optionally one or more additional substances, from a number of different types of gaseous streams. For example, the process of the present invention may be used to remove carbon dioxide from the exhaust gas from a combustion process, such as the flue gases from furnaces and power plants. The process of the present invention may also used to remove carbon dioxide, and optionally one or more additional substances, from hydrocarbon-containing gaseous streams, in particular methane-containing gaseous streams. Thus, the process of the invention may advantageously be used from the removal of carbon dioxide, and optionally one or more additional substances, from natural gas and/or biogas. The processes of the present invention may advantageously be used for the removal of carbon dioxide from breathing gas mixtures in life support systems.

Without being bound by any particular theory, it is believed that absorption of carbon dioxide by the mixture of ionic liquid and water occurs at least in part by an acid/base chemical reaction between the ionic liquid anion and carbon dioxide or, more probably, between the ionic liquid anion and $H_2CO_3$ formed by the dissolution of carbon dioxide in water. However, once the chemical absorption capacity of the ionic liquid is spent, absorption of carbon dioxide continues via physical processes. This is observed experimentally by a distinct change in slope of a graph of $CO_2$ absorption against $CO_2$ partial pressure (see FIG. 5).

As noted above, carbon dioxide can be easily desorbed from the mixtures of ionic liquids and water by heating in the presence of a sparging gas (e.g. nitrogen gas), or by pressure reduction, allowing the mixtures to be recycled to the separation process without loss or degradation of the absorbent mixture. It has been found that the mixture of ionic liquid and water can be repeatedly recycled to the separation process with little or no decrease in the carbon dioxide absorption capacity of the absorbent.

It will be appreciated that where the ionic liquid/water absorbent is also used to remove water from the gas stream, then it will be necessary to periodically or continuously remove water from the absorbent so as to maintain the water content of the absorbent within the limits indicated above.

Water may be removed from the absorbent for example by drying at 60 to 80° C. under vacuum or by sparging a dry gas at elevated temperature.

Where the process of the invention is operated continuously, a portion of the absorbent is continuously or periodically removed from the process to remove carbon dioxide and optionally water so as to restore the composition of the absorbent. The absorbent is subsequently recycled to the to the carbon dioxide removal process.

In accordance with the process of the present invention, a gaseous stream is recovered having reduced content of carbon dioxide, and optionally one or more other substances such as water, when compared to the composition of the gaseous stream fed to the process.

It will be appreciated that the process of the present invention may be integrated into processing plants as one stage of a multi-stage processing of gaseous streams. For instance, the process of the present invention could be used in a natural gas refinery as one stage in the production of a commercial natural gas product, wherein other stages could include removal of nitrogen and removal of heavy hydrocarbons. Alternatively, the process of the present invention could be used in a flue gas treatment plant as one stage of a multi-stage processing of flue gases, where other stages could for instance include removal of particulates and catalytic conversion of $NO_x$.

In another aspect, the present invention provides the use of a process as defined in above to absorb carbon dioxide and at least one other substance from a gaseous stream. Preferably, the at least one other substance is water.

In a further aspect, the present invention provides the use of an ionic liquid as defined above for absorbing carbon dioxide and water from a gaseous stream.

The present invention will now be described by way of Examples, and with reference to the attached figures, wherein:

FIG. 1 also shows the carbon dioxide solubilities of the comparative absorbent systems discussed in Examples 3, 4 and 5;

Figure 5:
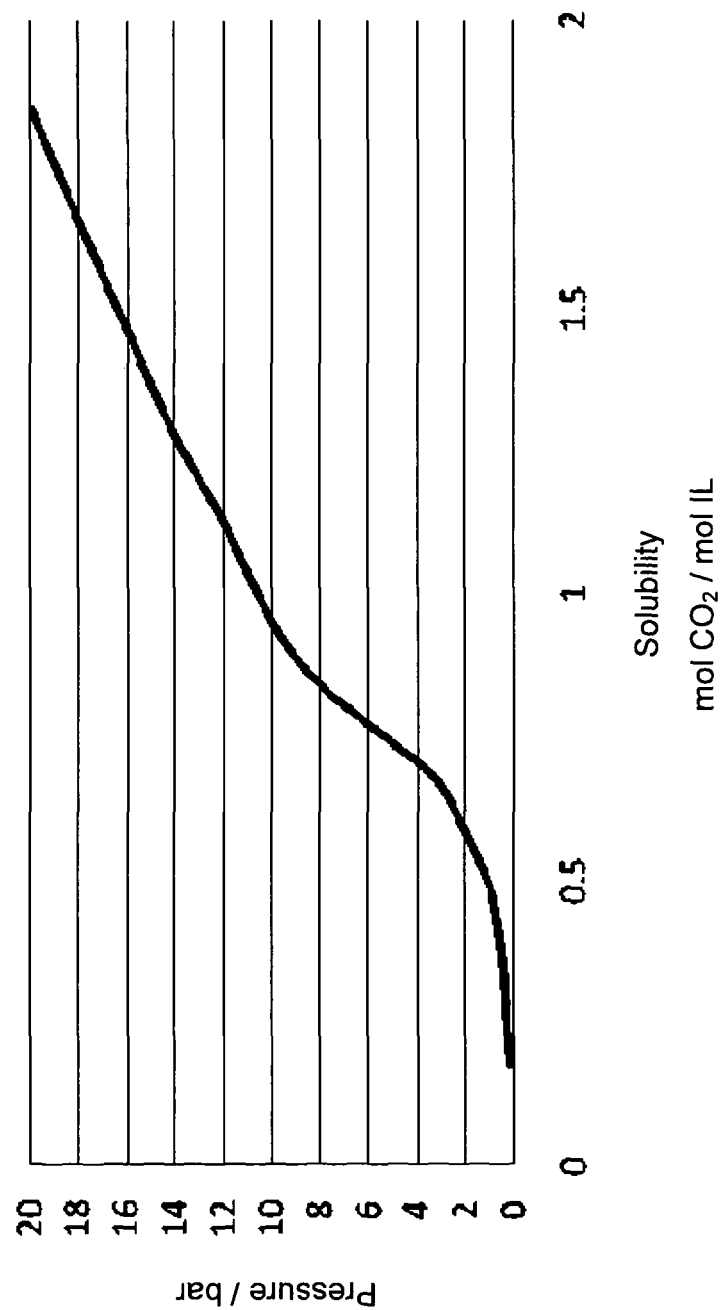
Figure 6A:
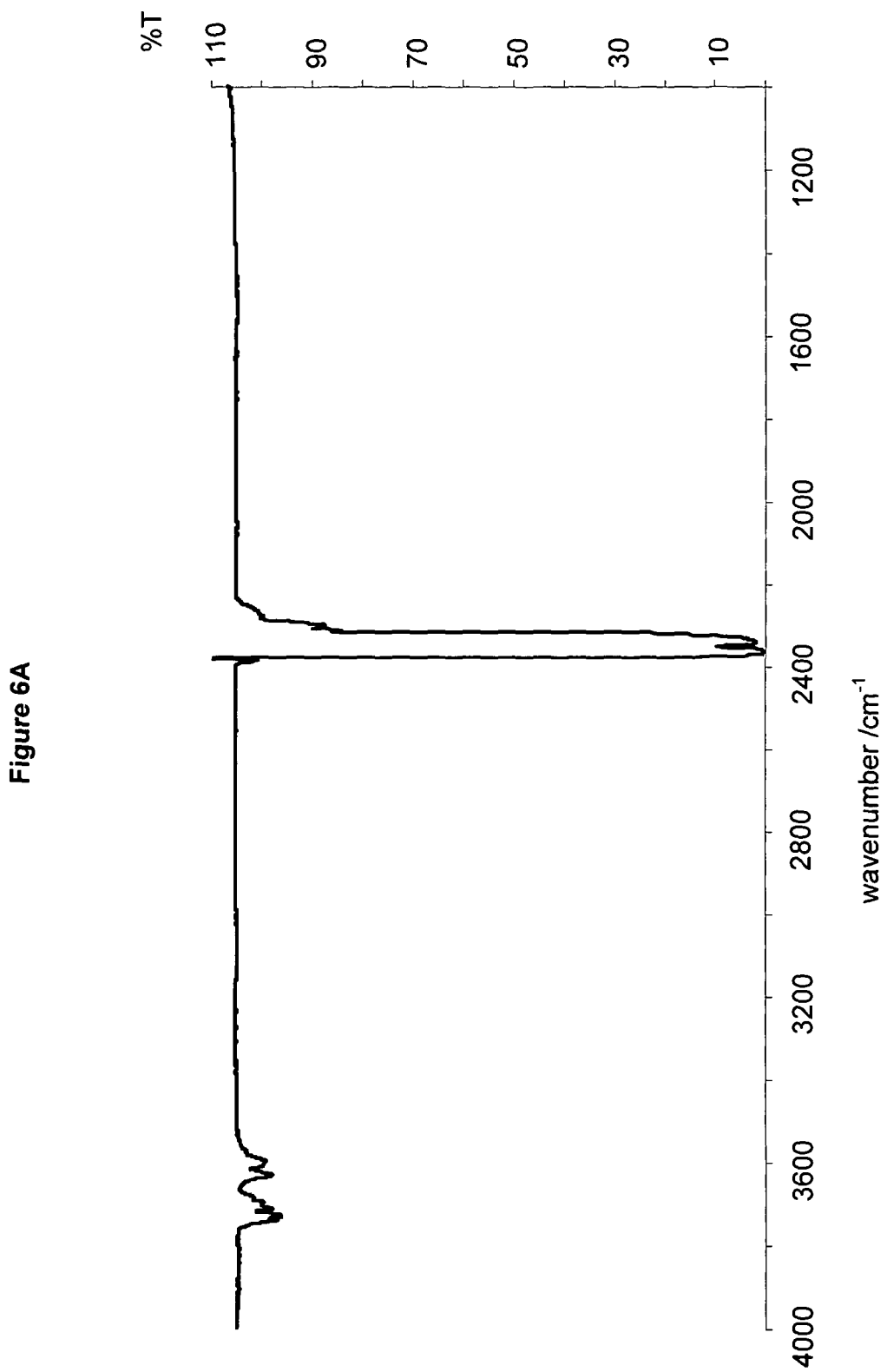
Figure 6B:
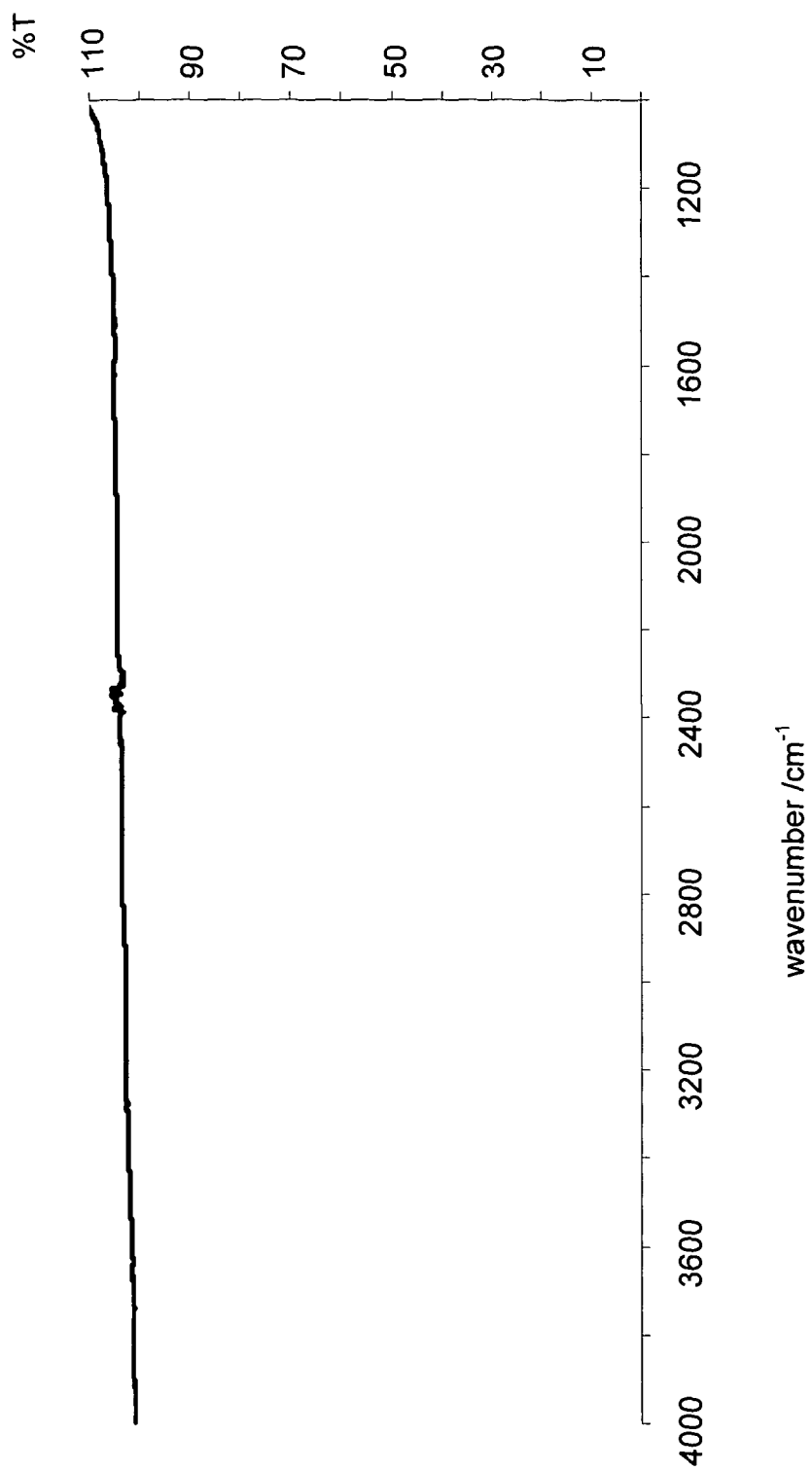

FIG. 5 shows the $CO_2$ uptake of a mixture of tributylmethylphosphonium propanoate and water in an ionic liquid:water ratio of 40:60 (see Example 9); and FIG. 6A shows the IR spectrum of air spiked with $CO_2$. FIG. 6B shows the corresponding IR spectrum when the air spiked with $CO_2$ has been bubbled through tributylmethylphosphonium propanoate and water in an ionic liquid; water ratio of 40:60 (see Example 10).

EXAMPLES

Example 1

This example describes the general experimental method used to determine the solubility of carbon dioxide in the ionic liquid water mixtures.

In a typical experiment, the volume of a pressure vessel [Parr pressure system] was first determined by evacuating it under reduced pressure and subsequently pumping a known amount of gas at a certain temperature and pressure into the vessel. Measurement of the amount of gas was read as the volume of gas at standard conditions from the mass flow controller [BROOKS Smart Massflow]. The ideal gas law was used to calculate the actual volume of the pressure vessel.

A known volume of a tetraalkylphosphonium ionic liquid having the formula ($[P_{n-n-n-m}][R^xCO_2]$, where n and m are integers which indicate the number of carbon atoms in the alkyl chain, and $R^x$ is hydrogen or a $C_1$ to $C_{10}$ alkyl) and water (ca. 5.0 mL) was placed in the pressure vessel, degassed for 5 min under reduced pressure. The carbon dioxide was then pumped into the stirred pressure vessel (1000 rpm) through the mass flow controller up to 500 kPa and at 25.0° C. The system was allowed to equilibrate for 15 min or until no more gas was added according to the mass flow controller.

Calculation of the total amount of gas introduced in the pressure vessel was conducted from the reading in the mass flow controller. The actual amount of gas in the gas phase was calculated by the ideal gas law, where the volume of the gas phase was equal to the volume of the pressure vessel minus the volume of the liquid phase. The amount of gas dissolved in the liquid phase was calculated by subtracting the actual amount of gas in the gas phase from the total amount of gas introduced in the pressure vessel.

Results expressed as a molar concentration (mol·L$^{-1}$) and as SCF/100 gal are shown in Table 1, where mole fraction water indicates the mole fraction of water in the mixture of ionic liquid and water The amount of water in the liquid mixtures was quantified by Karl-Fischer titration, and/or $^1$H NMR.

TABLE 1

| Ionic Liquid | Mole fraction water | Solubility (mol · L$^{-1}$) | Solubility (SCF/100 gal) |
| --- | --- | --- | --- |
| $P_{2,2,2,8}$ formate | 0.50 | 1.900 | 600.34 |
| $P_{4,4,4,4}$ formate | 0.51 | 2.070 | 654.05 |
| $P_{4,4,4,6}$ formate | 0.50 | 1.66 | 538.47 |
| $P_{4,4,4,8}$ formate | 0.53 | 1.877 | 605.47 |
| $P_{4,4,4,10}$ formate | 0.53 | 2.149 | 692.46 |
| $P_{4,4,4,12}$ formate | 0.52 | 1.464 | 473.19 |
| $P_{6,6,6,14}$ formate | 0.48 | 1.100 | 347.56 |
| $P_{2,2,2,8}$ acetate | 0.53 | 2.480 | 783.6 |
| $P_{4,4,4,6}$ acetate | 0.49 | 2.137 | 689.26 |
| $P_{4,4,4,8}$ acetate | 0.51 | 2.067 | 666.34 |
| $P_{4,4,4,10}$ acetate | 0.49 | 2.753 | 886.26 |
| $P_{4,4,4,12}$ acetate | 0.48 | 2.307 | 743.29 |

Example 2

Solubility of Carbon Dioxide in Recycled Tetraalkylphosphonium Carboxylate/Water Mixtures The mixtures of ionic liquids and water containing absorbed carbon dioxide from Example 1 were recycled by stirring in a glass round bottom flask attached to a reflux condenser while $N_2$ gas was bubbled through the solution for 15 min at 60 to 70° C. The water content of the resulting solutions was determined by Karl-Fischer titration and, if needed, additional water was added up to the desired composition. Solubility of carbon dioxide in the resulting liquid mixtures of $[P_{4-4-4-4}][HCO_2]$, and water was measured as described in Example 1. After a first recycle, the solubility of carbon dioxide was found to be 2.01 mol·L$^{-1}$. After a second recycle, the solubility of carbon dioxide was found to be 2.07 mol·L$^{-1}$. Thus, it can be observed that the ability of the absorbent to absorb carbon dioxide is not reduced after recycling.

Comparative Example 3

Solubility of Carbon Dioxide in 1-butyl-3-methylimidazolium bis[(trifluoromethyl)-sulfonyl]imide The solubility of carbon dioxide in dry 1-butyl-3-methylimidazolium bis[(trifluoromethyl)-sulfonyl]imide ([bmim][NTf$_2$]) was measured at 500 kPa and at 25.0° C. as described in Example 1. This ionic liquid was chosen as a comparative example of a strictly physical $CO_2$ absorber. The solubility of carbon dioxide in the ionic liquid was found to be 0.594 mol·L$^{-1}$. By way of a further comparison, the solubility of carbon dioxide in Genosorb®, a commercially available absorbent solvent based on polyethylene glycol dimethyl ethers. The solubility of carbon dioxide in Genosorb® was found to be 0.64 mol·L$^{-1}$.

Comparative Example 4

Solubility of Carbon Dioxide in Dry [$P_{6-6-6-14}$][$CH_3CO_2$]

The solubility of carbon dioxide in dry [$P_{6-6-6-14}$][$CH_3CO_2$] (<0.25 wt % water content) was measured at 500 kPa and at 25.0° C. as described in Example 1. The solubility of carbon dioxide in the ionic liquid was found to be 0.52 mol·L$^{-1}$.

Comparative Example 5

Solubility of Carbon Dioxide in Monoethanolamine/Water Mixtures

The solubility of carbon dioxide in a mixture of monoethanolamine (MEA) and water (30:70 MEA/H$_2$O weight ratio) was measured at 500 kPa and at 25.0° C. as described in Example 1. This liquid solution was chosen as a comparative example of a carbon dioxide chemical absorber used commercially in industry, especially in natural gas processing operations. The solubility of carbon dioxide in the monoethanolamine/water mixture was found to be 3.57 mol·L$^{-1}$.

Example 6

Solubility of Methane in Tetraalkylphosphonium Carboxylate/Water Mixtures

The solubility of methane in the [P$_{4,4,4,4}$][HCO$_2$]/water mixture of Example 1 was measured at 500 kPa and 25.0° C. as described in Example 1. The amount of water in the liquid mixture was quantified by Karl-Fischer titration, and/or $^1$H NMR. The solubility of methane in the ionic liquid/water mixture was found to be 0.07 mol·L$^{-1}$, clearly demonstrating the selectivity of the process of the invention.

Example 7

Separation of Methane from a CO$_2$/CH$_4$ Gas Mixture Using Tetraalkylphosphonium Carboxylate/Water Mixtures A known amount of [P$_{4,4,4,4}$][HCO$_2$]/water mixture (ca. 10 mL) was placed in a pressure vessel and degassed by stirring for 5 min under reduced pressure. A gas mixture containing 7.22 mol % CO$_2$ in CH$_4$ (model natural gas) was then pumped into the reactor up to a pressure of ca. 3000 kPa. The mixture was vigorously stirred at 25.0° C. until pressure equilibration, which took about 10 min. The gas was then sampled out and analysed on the chromatographic gas analyser. The ratio of CO$_2$ was found to have been reduced to 2.32 mol %.

Example 8

Variation of Carbon Dioxide Absorption with Water Content

Figure 1:
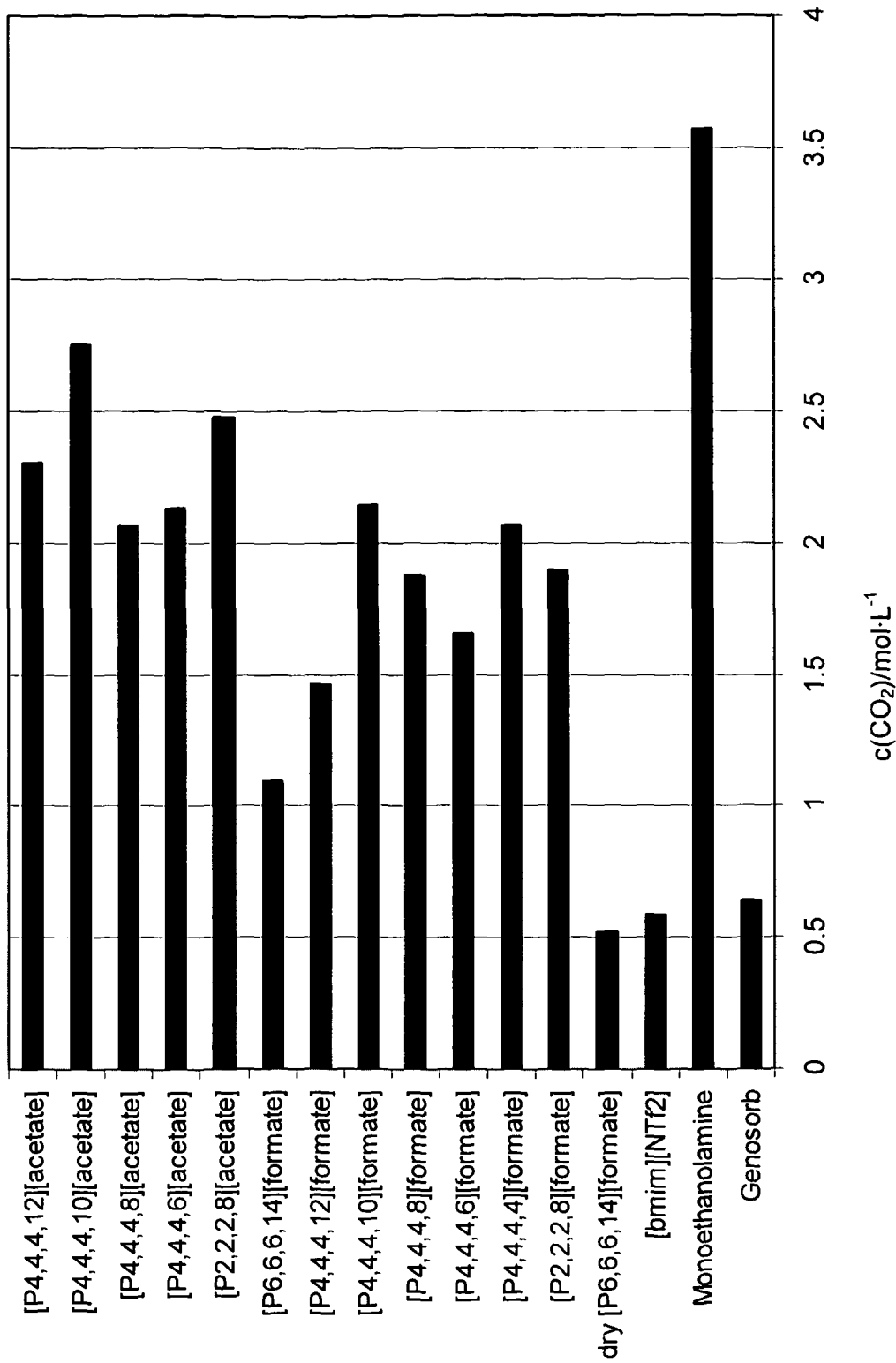
FIG. 1 is a histogram showing the carbon dioxide solubility in the ionic liquid/water mixtures described in Example 1 at 500 kPa and at 25° C.
Figure 2:
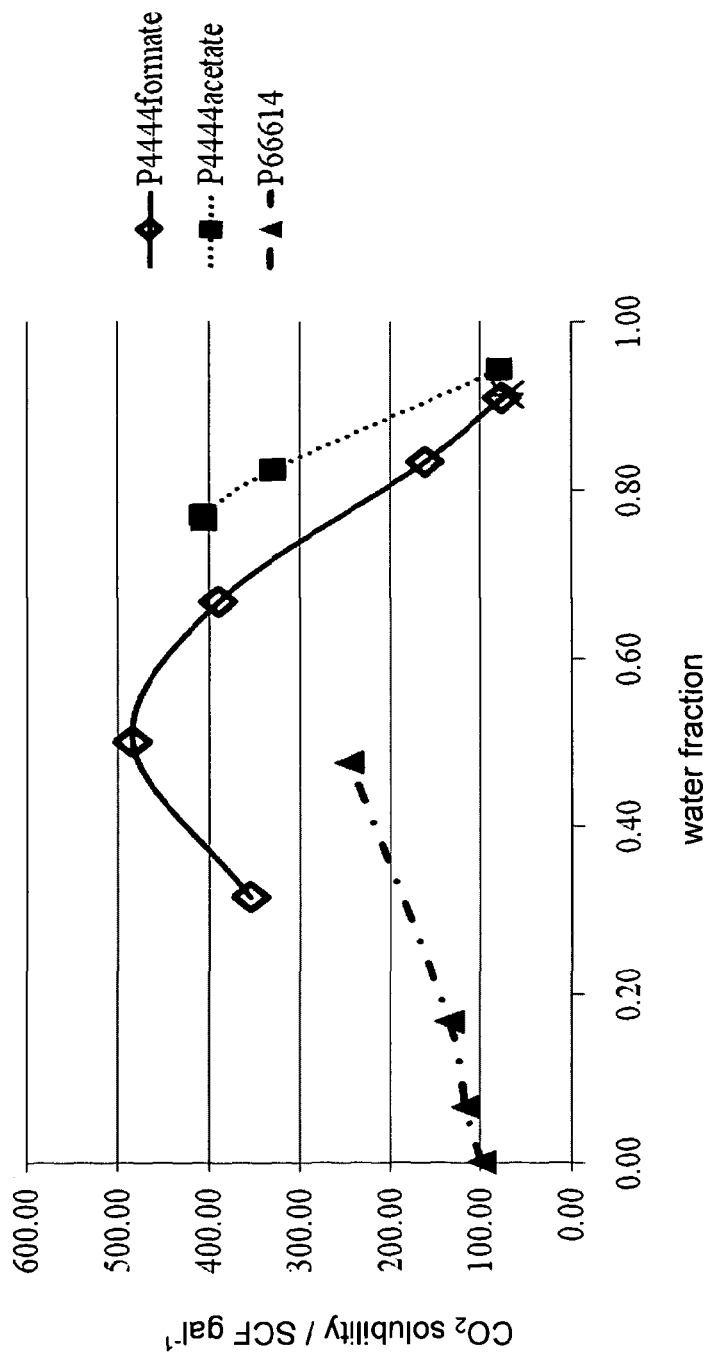
FIG. 2 shows the variation of carbon dioxide solubility with water content for a variety of ionic liquids.

The solubility of carbon dioxides in absorbents comprising the ionic liquids [P$_{4,4,4,4}$][HCO$_2$], [P$_{4,4,4,4}$][CH$_3$CO$_2$], and [P$_{6,6,6,14}$][HCO$_2$] with varying amounts of water was measured. The results are shown in FIG. 2.

Example 9

Chemical and Physical Absorption

To observe the chemical and physical absorption behaviour of ionic liquid/water mixtures, the solubility of CO$_2$ in a mixture of tributylmethylphosphonium propanoate and water at a ratio of 40:60 (ionic liquid:water) was plotted against CO$_2$ partial pressure. As shown in FIG. 5, typical chemical absorption behaviour is observed at low CO$_2$ pressure, with the CO$_2$ uptake increasing asymptotically as the 1:1 molar ratio is approached. Once the saturation pressure is reached (i.e. a 1:1 molar ratio of ionic liquid and CO$_2$), the system switches to the linear response expected of a physical CO$_2$ absorber. The linear increase in absorption is observed continuously to the highest CO$_2$ partial pressure observed.

Example 10

Separation of Carbon Dioxide from Air

The removal of carbon dioxide from air was examined by analysis of IR absorption spectra.

FIG. 6A shows the IR absorption spectrum of air containing an elevated level of CO$_2$ (ca. 40 mol %). The same air/CO$_2$ mixture was bubbled through a mixture of tributyl-methyl-phosphonium propanoate and water in an ionic liquid:water ratio of 40:60) over a period of 20 minutes. As shown in FIG. 6B, the IR absorption peaks due to the carbon dioxide stretching frequencies are not observed, indicating that substantially all CO$_2$ has been removed from the CO$_2$/air mixture.

Example 11

Removal of Water

Figure 3:
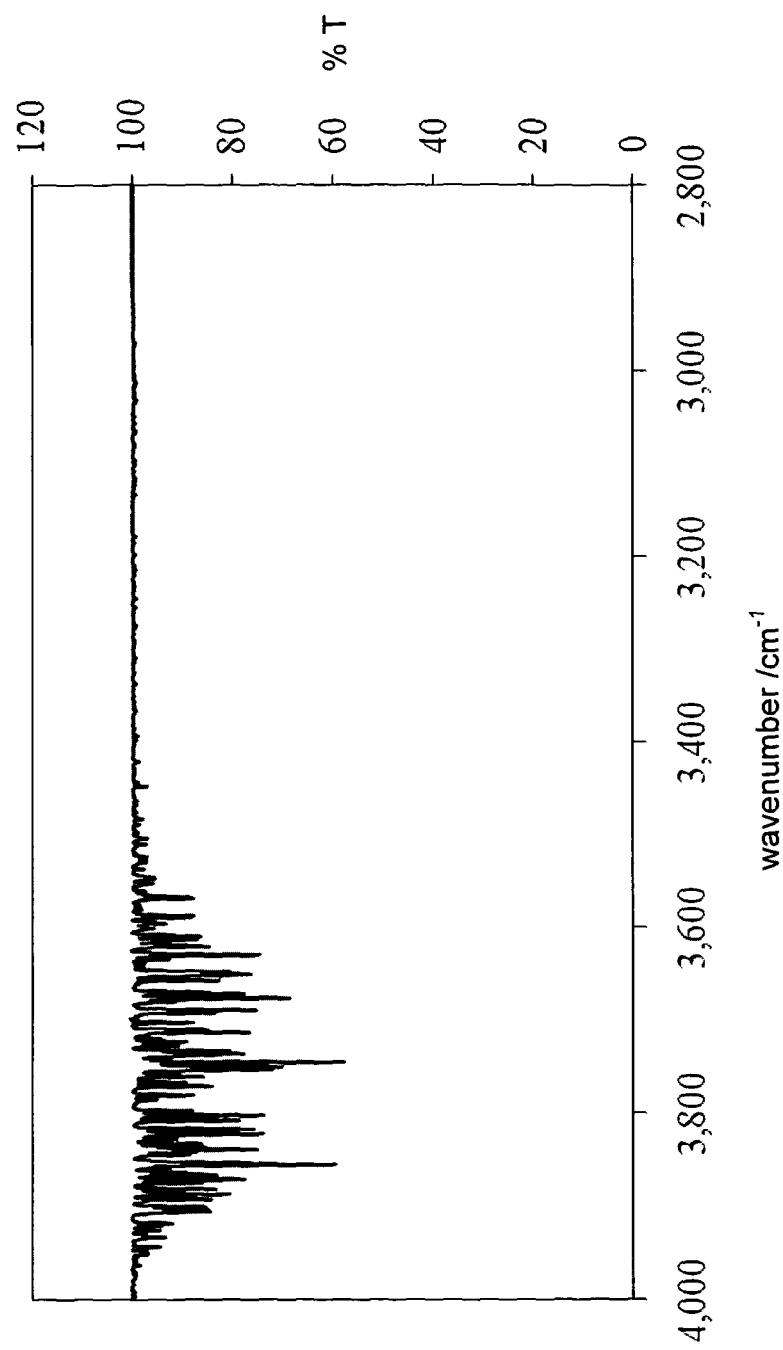
FIG. 3 is the FTIR spectrum of nitrogen gas saturated with water.
Figure 4:
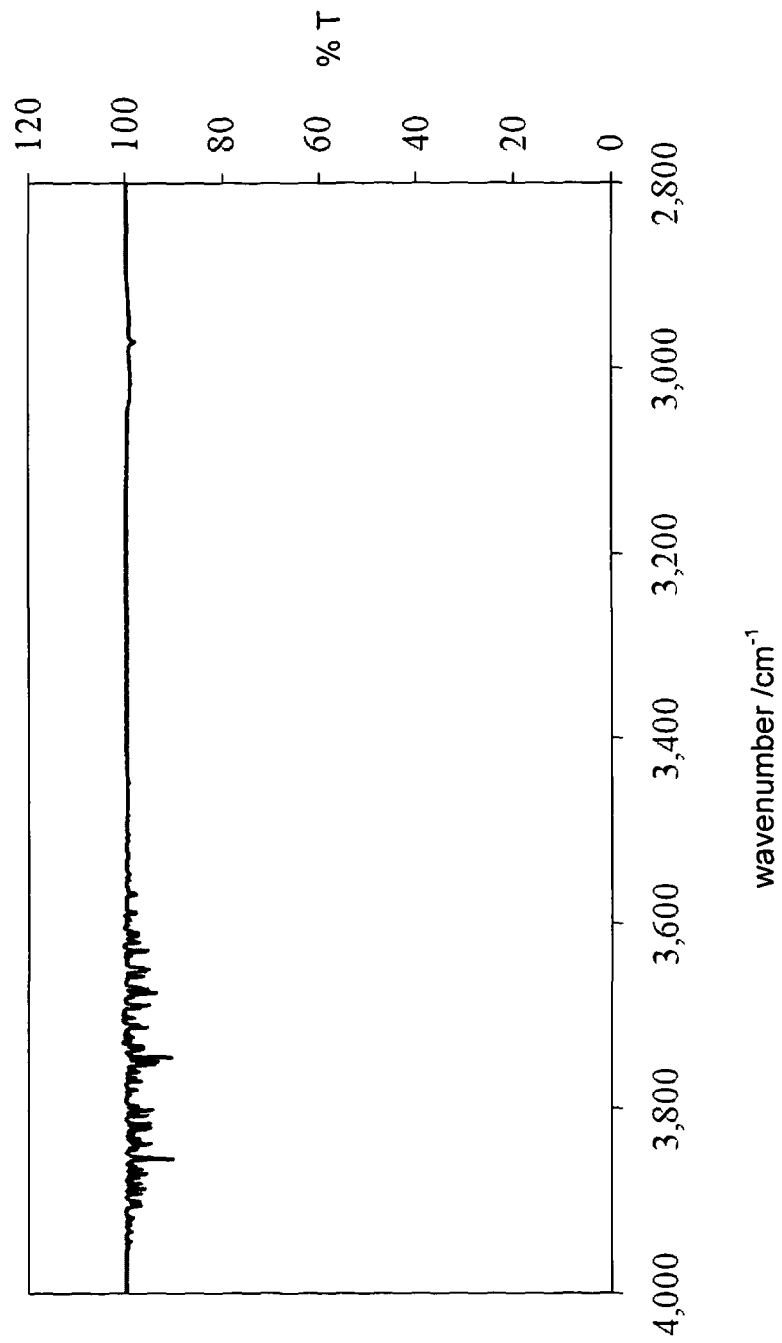
FIG. 4 is the FTIR spectrum of the nitrogen gas of FIG. 3 after being bubbled through an absorbent ionic liquid composition.

The removal of water by the ionic liquid compositions of the invention was examined by bubbling nitrogen gas saturated with water through [P$_{6,6,6,8}$][HCO$_2$] at 15° C. The Fourier transform infrared spectra (FTIR) of the gas were measured both before and after contact with the ionic liquid (see FIGS. 3 and 4 respectively). It will be observed that the peaks in the region 3400 to 4000 cm$^{-1}$ attributable to water are significantly reduced.

The invention claimed is:

1. A process for removing carbon dioxide from a gaseous stream comprising contacting the gaseous stream with a carbon dioxide absorbent comprising a mixture of an ionic liquid and water in a molar ratio of from 55:45 to 45:55 and recovering a gaseous stream having reduced carbon dioxide content, wherein the ionic liquid has the formula

[Cat+][X−]

wherein [Cat+] represents a cationic species selected from tetrasubstituted phosphonium cations, tetrasubstituted ammonium cations, trisubstituted sulfonium cations, guanidinium cations and quinolinium cations; and [X−] represents an anionic species which is a conjugate base of a carboxylic acid;

and wherein [Cat+] is selected from:

(i) [P(Ra)(Rb)(Rc)(Rd)]$^+$, [N(Ra)(Rb)(Rc)(Rd)]$^+$, and [S(Rb)(Rc)(Rd)]$^+$, wherein Ra, Rb, Rc, and Rd are each independently selected from a C1 to C20 straight chain or branched alkyl group, a C3 to C8 cycloalkyl group, or a C6 to C10 aryl group, or wherein any two of Ra, Rb, Rc, and Rd together form a methylene chain of the formula —(CH$_2$)$_q$—, where q is an integer of from 4 to 7, and wherein said alkyl, cycloalkyl or aryl groups, or said methylene chain are unsubstituted;

(ii) quinolinium cations of the formula

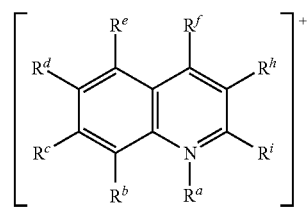

wherein Ra, Rb, Rc, Rd, Re, Rf, Rg, Rh, and Ri are each independently selected from hydrogen, a C1 to C20 straight chain or branched alkyl group, a C3 to C8 cycloalkyl group, or a C6 to C10 aryl group, or any two of Rb, Rc, Rd, Re, Rf, Rh and Ri attached to adjacent carbon atoms may form a saturated methylene chain —(CH$_2$)$_q$— wherein q is from 3 to 6, and wherein said alkyl, cycloalkyl or aryl groups, or said methylene chain are unsubstituted; or (iii) guanidinium cations of the formula

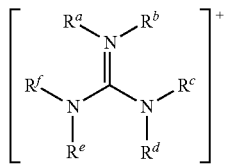

wherein Ra, Rb, Rc, Rd, Re, and Rf are each independently selected from a C1 to C20 straight chain or branched alkyl group, a C3 to C8 cycloalkyl group, or a C6 to C10 aryl group, or any two of Rb, Rc, Rd, Re, Rf, Rh, and Ri attached to adjacent carbon atoms may form a saturated methylene chain —(CH$_2$)$_q$— wherein q is from 3 to 6, and wherein said alkyl, cycloalkyl, or aryl groups, or said methylene chain are unsubstituted.

2. A process according to claim 1, wherein [Cat+] is selected from [P(Ra)(Rb)(Rc)(Rd)]+ and [N(Ra)(Rb)(Rc)(Rd)]+ and wherein Ra, Rb, Rc, and Rd are as defined in claim 1.

3. A process according to claim 1, wherein [Cat+] comprises [P(Ra)(Rb)(Rc)(Rd)]+ and wherein Ra, Rb, Rc, and Rd are as defined in claim 1.

4. A process according to claim 1, wherein Ra, Rb, Rc, and Rd are each independently selected, where present, from a C1 to C16 straight chain or branched alkyl group, or wherein any two of Ra, Rb, Rc, and Rd together form a methylene chain of the formula (CH2)q—, where q is an integer of from 4 or 5.

5. A process according to claim 1, wherein [X−] comprises an anion having the formula [RxCO2]—, wherein Rx is selected from hydrogen, a C1 to C10 straight chain or branched alkyl group, a C3 to C8 cycloalkyl group, or a C6 to C10 aryl group, wherein said alkyl, cycloalkyl or aryl groups are unsubstituted or may be substituted by one or more groups selected from —F, —Cl, —OH, —CN, —NO2, —SH, =O, and —CO2H.

6. A process according to claim 5, wherein [X−] is selected from formate, acetate, trifluoroacetate, hydroxyacetate, propanoate, pentafluoropropanoate, lactate, butanoate, isobutanoate, pivalate, pyruvate, thiolactate, oxalate, tartrate, malonate, succinate, adipate, and benzoate.

7. A process according to claim 6, wherein [X−] is selected from formate, acetate, trifluoroacetate, hydroxyacetate, propanoate, pentafluoropropanoate, lactate, butanoate, isobutanoate, and pivalate.

8. A process according to claim 7, wherein [X−] is selected from formate or acetate.

9. A process according to claim 1, wherein the ionic liquid has a melting point of 100° C. or less.

10. A process according to claim 9, wherein the ionic liquid has a melting point of 50° C. or less.

11. A process according to claim 10, wherein the ionic liquid has a melting point of 25° C. or less.

12. A process according to claim 1, wherein the molar ratio of ionic liquid to water is about 50:50.

13. A process according to claim 1, wherein the gaseous stream is contacted with the carbon dioxide absorbent at a temperature of from 10 to 80° C.

14. A process according to claim 13, wherein the gaseous stream is contacted with the carbon dioxide absorbent at a temperature of from 10 to 50° C.

15. A process according to claim 14, wherein the gaseous stream is contacted with the carbon dioxide absorbent at a temperature of from 20 to 30° C.

16. A process according to claim 1, wherein the gaseous stream is contacted with the carbon dioxide absorbent at a pressure of from 100 to 2000 kPa.

17. A process according to claim 16, wherein the gaseous stream is contacted with the carbon dioxide absorbent at a pressure of from 200 to 1000 kPa.

18. A process according to claim 1, wherein carbon dioxide is subsequently released from the carbon dioxide absorbent.

19. A process according to claim 18, wherein the carbon dioxide is subsequently released by subjecting the carbon dioxide absorbent to reduced pressure, or by sparging the carbon dioxide absorbent with a gas at elevated temperature.

20. A process according to claim 1, wherein the gaseous stream is a hydrocarbon-containing gaseous stream.

21. A process according to claim 20, wherein the gaseous stream is a methane-containing gaseous stream.

22. A process according to claim 21, wherein the gaseous stream is a natural gas stream.

23. A process according to claim 21, wherein the gaseous stream is a biogas-derived stream.

24. A process according to claim 1, wherein the gaseous stream is a flue gas stream.

25. A process according to claim 1, wherein the gaseous stream is a breathing gas stream for a life support system.

26. A process according to claim 17, wherein the gaseous stream is contacted with the carbon dioxide absorbent at a pressure of about 500 kPa.

27. A process for removing carbon dioxide from a gaseous stream comprising contacting the gaseous stream with a carbon dioxide absorbent comprising a mixture of an ionic liquid and water in a molar ratio of from 55:45 to 45:55 and recovering a gaseous stream having reduced carbon dioxide content, wherein the ionic liquid has the formula

[Cat+][X−]

wherein [Cat+] represents a cationic species selected from tetrasubstituted phosphonium cations, tetrasubstituted ammonium cations, trisubstituted sulfonium cations, guanidinium cations, and quinolinium cations; and [X−] represents an anionic species which is a conjugate base of a carboxylic acid; and wherein:

(i) [Cat$^+$] is selected from [P(Ra)(Rb)(Rc)(Rd)]$^+$, [N(Ra)(Rb)(Rc)(Rd)]$^+$, and [S(Rb)(Rc)(Rd)]$^+$, wherein Ra, Rb, Rc, and Rd are each independently selected from a C1 to C20 straight chain or branched alkyl group, a C3 to C8 cycloalkyl group, or a C6 to C10 aryl group, or wherein any two of Ra, Rb, Rc, and Rd together form a methylene chain of the formula —(CH$_2$)$_q$—, where q is an integer of from 4 to 7, and wherein said alkyl, cycloalkyl or aryl groups, or said methylene chain are unsubstituted;

(ii) [Cat$^+$] is selected from quinolinium cations of the formula

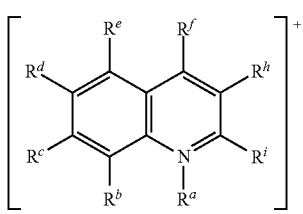

wherein Ra, Rb, Rc, Rd, Re, Rf, Rg, Rh, and Ri are each independently selected from hydrogen, a C1 to C20 straight chain or branched alkyl group, a C3 to C8 cycloalkyl group, or a C6 to C10 aryl group, or any two of Rb, Rc, Rd, Re, Rf, Rh and Ri attached to adjacent carbon atoms may form a saturated methylene chain —$(CH_2)_q$— wherein q is from 3 to 6, and wherein said alkyl, cycloalkyl or aryl groups, or said methylene chain are unsubstituted; or (iii) [Cat$^+$] is selected from guanidinium cations of the formula

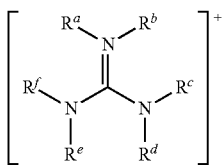

wherein Ra, Rb, Rc, Rd, Re, and Rf are each independently selected from a C1 to C20 straight chain or branched alkyl group, a C3 to C8 cycloalkyl group, or a C6 to C10 aryl group, or any two of Rb, Rc, Rd, Re, Rf, Rh and Ri attached to adjacent carbon atoms may form a saturated methylene chain —$(CH_2)_q$— wherein q is from 3 to 6, and wherein said alkyl, cycloalkyl or aryl groups, or said methylene chain are unsubstituted; and subsequently releasing the carbon dioxide from the carbon dioxide absorbent by at least one of (i) subjecting the carbon dioxide absorbent to reduced pressure or (ii) sparging the carbon dioxide absorbent with a gas at elevated temperature.

28. A process according to claim 1, wherein the step of contacting the gaseous stream with a carbon dioxide absorbent in the process further comprises removing water from the gaseous stream, and wherein the process further comprises subsequently releasing water from the absorbent by drying at elevated temperature or by sparging with a dry gas at elevated temperature.

29. A process according to claim 27, wherein the step of contacting the gaseous stream with a carbon dioxide absorbent in the process further comprises removing water from the gaseous stream, and wherein the process further comprises subsequently releasing water from the absorbent by drying at elevated temperature or by sparging with a dry gas at elevated temperature.

30. A process according to claim 27, wherein the carbon dioxide is subsequently released by sparging the carbon dioxide absorbent with a gas at elevated temperature.

31. A process according to claim 27, wherein the carbon dioxide is released from the carbon dioxide absorbent by subjecting the carbon dioxide absorbent to reduced pressure, wherein subsequent to the step of contacting the gaseous stream with the carbon dioxide absorbent, and prior to the step of subjecting the carbon dioxide absorbent to reduced pressure, the absorbent is not exposed to pressures higher than the pressure used during the contacting step.

* * * * *